US009611922B2

(12) United States Patent
Kohlmeyer et al.

(10) Patent No.: US 9,611,922 B2
(45) Date of Patent: Apr. 4, 2017

(54) ANTI-ROTATE CYLINDER APPARATUS

(71) Applicant: PARKER-HANNIFIN CORPORATION, Cleveland, OH (US)

(72) Inventors: Bruce Kohlmeyer, Vernon Hills, IL (US); Kevin Koenigs, Prairie View, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 164 days.

(21) Appl. No.: 14/246,607

(22) Filed: Apr. 7, 2014

(65) Prior Publication Data

US 2014/0298933 A1    Oct. 9, 2014

Related U.S. Application Data

(60) Provisional application No. 61/809,010, filed on Apr. 5, 2013.

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/20* | (2006.01) |

(52) U.S. Cl.
CPC ....... *F16H 25/20* (2013.01); *F16H 2025/204* (2013.01); *F16H 2025/2081* (2013.01); *Y10T 74/18648* (2015.01)

(58) Field of Classification Search
CPC .. F16H 25/24; F16H 25/2003; F16H 25/2006; F16H 25/2209; F16H 2025/204; F16H 2025/2445

USPC .......... 74/89.23, 89.32, 89.33, 89.34, 89.36, 74/89.42, 424.71
See application file for complete search history.

(56) References Cited

U.S. PATENT DOCUMENTS

| | | | | | |
|---|---|---|---|---|---|
| 3,337,732 | A | * | 8/1967 | Opocensky | G21H 5/00 269/60 |
| 3,339,892 | A | * | 9/1967 | Dixon | B66F 3/18 254/103 |
| 3,665,782 | A | * | 5/1972 | Loftus | B23Q 5/408 74/89.36 |
| 3,977,262 | A | * | 8/1976 | Randolph | B41J 19/20 400/328 |

(Continued)

*Primary Examiner* — William Kelleher
*Assistant Examiner* — Jake Cook
(74) *Attorney, Agent, or Firm* — Renner, Otto, Boisselle & Sklar, LLP

(57) ABSTRACT

A cylinder assembly includes a cylinder, a nut and screw assembly, a thrust tube that extends axially from the nut and out the cylinder, a drive assembly mounted to the cylinder for rotating the screw to effect axial translation of the nut relative to the screw, thereby causing the thrust tube to axially extend or retract relative to the cylinder, and an anti-rotate feature for restricting rotation of the nut relative to the cylinder. The anti-rotate feature may include a guide member coupled to the nut and including at least one key on one of the guide member or the cylinder and at least one corresponding slot on the other of the guide member or the cylinder that engages on the key. The guide member may be allowed limited movement relative to the nut and/or the cylinder thereby preventing binding of the nut relative to the cylinder.

20 Claims, 14 Drawing Sheets

(56) References Cited

U.S. PATENT DOCUMENTS

| | | | | |
|---|---|---|---|---|
| 4,302,981 | A | * | 12/1981 | Wayman ................ B23Q 5/408 74/89.36 |
| 4,372,222 | A | * | 2/1983 | Tice ...................... B23Q 5/408 108/137 |
| 5,362,111 | A | | 11/1994 | Harbin |
| 5,392,662 | A | * | 2/1995 | Jadrich ................. B23Q 5/408 267/160 |
| 6,199,539 | B1 | | 3/2001 | Pearlman et al. |
| 6,327,924 | B2 | * | 12/2001 | Nagai .......................... 74/89.33 |
| 6,408,706 | B1 | * | 6/2002 | Nagai ..................... F16C 29/02 384/29 |
| 6,422,101 | B2 | * | 7/2002 | Erikson ...................... 74/424.72 |
| 2003/0000322 | A1 | * | 1/2003 | Nagai ................ F16H 25/2204 74/89.36 |
| 2012/0297908 | A1 | * | 11/2012 | Bourgoine .............. F16H 25/20 74/89.23 |

\* cited by examiner

ANTI-ROTATE CYLINDER APPARATUS

FIELD OF INVENTION

The present invention relates generally to a cylinder assembly, and more particularly to a cylinder assembly having an anti-rotate feature. The anti-rotate feature is disposed internal to the cylinder and restricts rotation of a nut of a nut and screw assembly for transferring force from the cylinder assembly to an external component.

BACKGROUND

Electro-mechanical cylinder assemblies typically use a rotating roller screw disposed within a cylinder to drive a nut coupled to the screw. As the nut linearly translates along a length of the screw, a thrust tube extending from the nut is caused to extend or retract with respect to the cylinder. Such assemblies typically have been used in conjunction with an external anti-rotate feature disposed downstream of the cylinder and of the thrust tube for hindering rotation of the nut and/or the thrust tube.

SUMMARY OF THE INVENTION

The present invention provides a cylinder assembly with a unique internal anti-rotate feature for restricting the rotation of a nut of a nut and screw assembly housed in a cylinder of the cylinder assembly. The anti-rotate feature includes a key and slot assembly of the nut and cylinder. The anti-rotate feature also includes a guide member having one of the key or slot and coupled to the nut. The guide member is allowed limited movement relative to the nut and the cylinder for accommodating misalignment therebetween, thereby preventing binding of the nut and the cylinder relative to one another.

More particularly, a cylinder assembly according to one aspect of the invention includes a cylinder, in particular a steel cylinder, a nut and screw assembly housed within the cylinder, a thrust tube that extends axially from the nut and out a first end of the cylinder, a drive assembly mounted at a second end of the cylinder opposite the first end for rotating the screw to effect translation of the nut along the screw, thereby causing the thrust tube to axially extend or retract relative to the cylinder, and an anti-rotate feature at least partially housed within the cylinder, the anti-rotate feature for restricting rotation of the nut relative to the cylinder.

The anti-rotate feature may include at least one key coupled to one of the nut or the cylinder and at least one corresponding slotted member coupled to the other of the nut or the cylinder that engages on the key.

The anti-rotate feature may include a guide member coupled between the nut and the cylinder, wherein one of the guide member or the cylinder includes a key, and wherein the other of the guide member or the cylinder includes a corresponding slot that engages on the key.

The guide member may be allowed limited movement relative to the nut to prevent binding of the nut and the cylinder relative to one another.

The guide member may be an annular member disposed about the screw.

The anti-rotate feature may include a guide member coupled between the cylinder and the nut, wherein the guide member is loosely constrained for canting movement to accommodate for misalignment of the nut relative to the cylinder.

The canting movement may include movement of the guide member about an axis orthogonal to a central longitudinal axis of the cylinder along which the nut translates.

The canting movement may include rotational movement of the guide member about an axis parallel to a central longitudinal axis of the cylinder along which the nut translates.

The guide member and the nut may be coupled via a slot and key arrangement, and the guide member and the cylinder may be coupled via another slot and key arrangement.

The anti-rotate feature may include a pair of opposed slotted members coupled to the nut and a pair of opposed keys coupled to the cylinder that are engaged with the opposed slotted members.

The opposed slotted members may be loosely coupled to the nut for canting movement to accommodate for misalignment of the nut relative to the cylinder.

The anti-rotate feature may include a guide member loosely constrained between the nut and the cylinder, wherein the guide member translates with the nut.

A cylinder assembly according to another aspect of the invention includes a cylinder extending between first and second ends, a screw housed by the cylinder, a nut disposed about and engaged with the screw, a thrust tube extending axially from the nut and disposed about the screw, the thrust tube at least partially extending from the first end of the cylinder, a guide member coupled to one of the nut or the thrust tube, a rail on the inner diameter of the cylinder, and a key provided on one of the guide member or the rail and a slot provided on the other of the guide member or the rail, wherein the key engages in the slot for restricting rotation of the nut relative to the cylinder, and wherein the guide member is allowed limited movement relative to the cylinder for preventing binding of the guide member with the rail.

The cylinder may be made of steel.

The guide member may be an annular member disposed about the screw.

The key may be provided on the inner diameter of the cylinder and the slot is provided on the guide member.

The limited movement of the guide member relative to the nut may include canting movement about an axis orthogonal to a central longitudinal axis of the cylinder along which the nut translates.

The limited movement of the guide member relative to the nut may include canting movement of the guide member about an axis parallel to a central longitudinal axis of the cylinder along which the nut translates.

According to yet another aspect of the invention, a cylinder assembly includes a cylinder, a nut and screw assembly housed within the cylinder, the screw rotatable relative to the housing and the nut translatable along the screw, and a guide member coupled between the nut and the cylinder, the guide member coupled to the nut via a key and slot arrangement, and the guide member coupled to the cylinder via another key and slot arrangement, wherein the nut is generally prevented from rotating relative to the cylinder via engagement of the keys on the slots of the key and slot arrangements, and wherein the guide member is carried by the nut.

The guide member may be loosely coupled between the nut and the cylinder for canting movement relative to the nut and the cylinder.

The foregoing and other features of the invention are described below in conjunction with the drawings.

DETAILED DESCRIPTION

Figure 1:
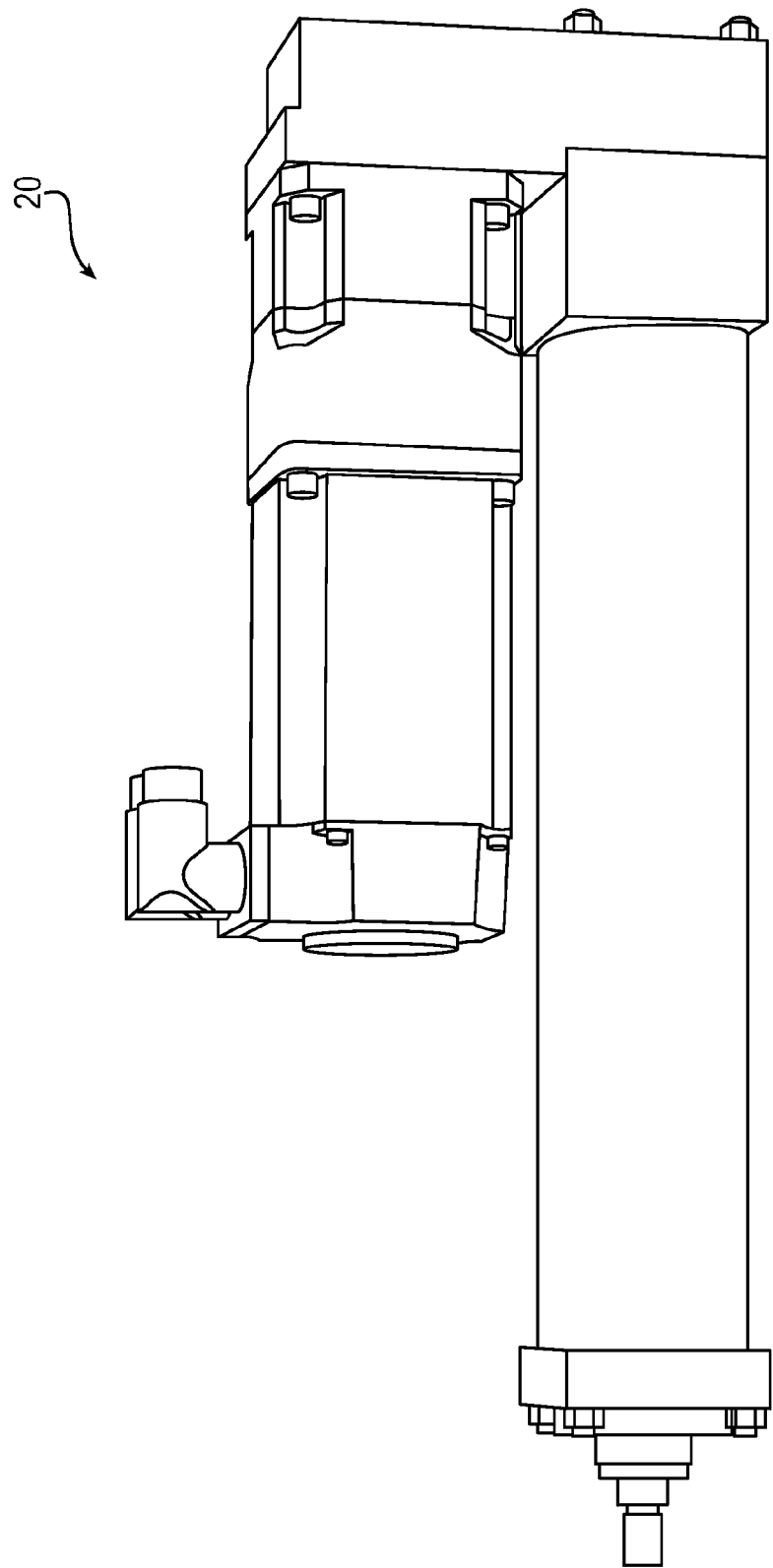
FIG. 1 is a perspective view of an exemplary cylinder assembly according to the invention.
Figure 2:
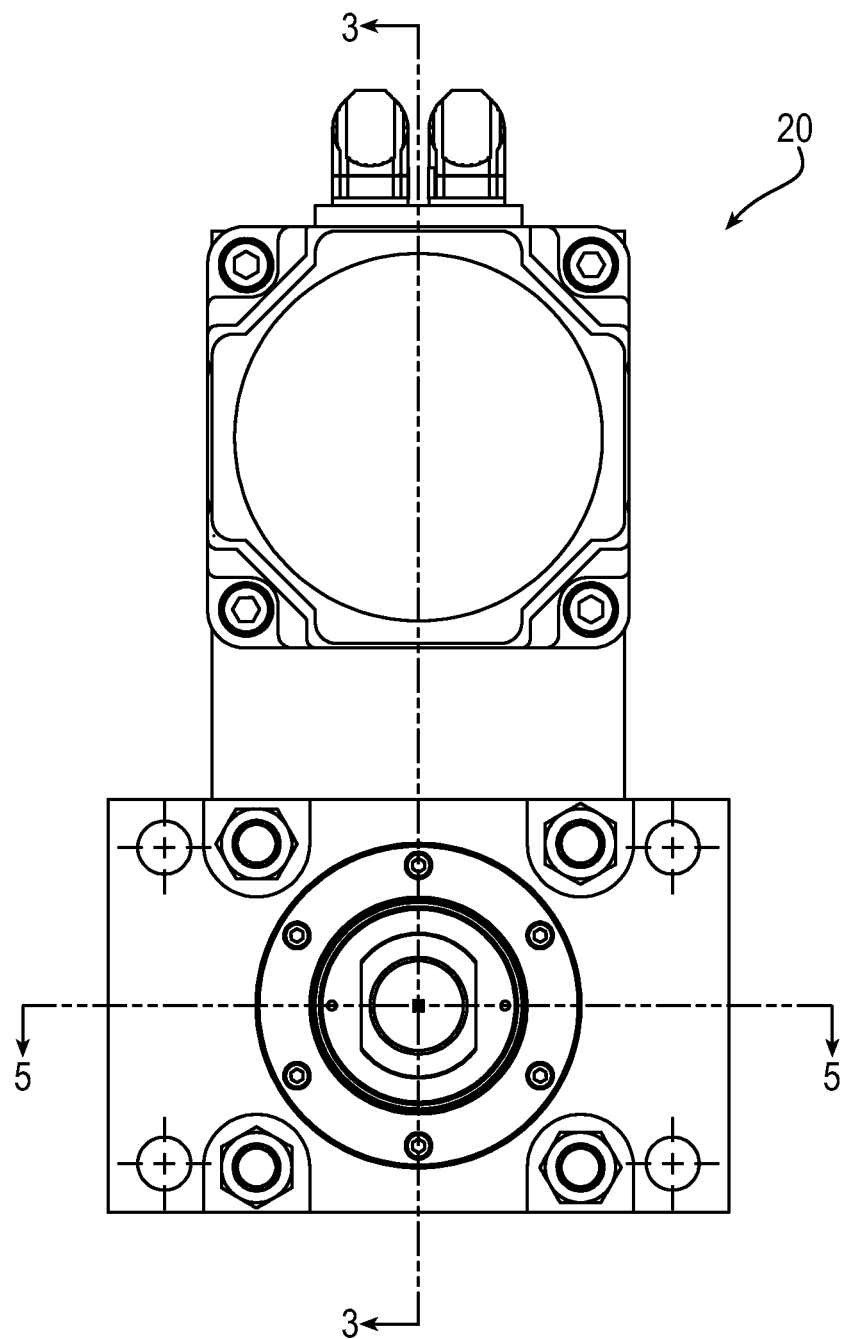
FIG. 2 is a rear end elevational view of the cylinder assembly of FIG. 1.
Figure 3:
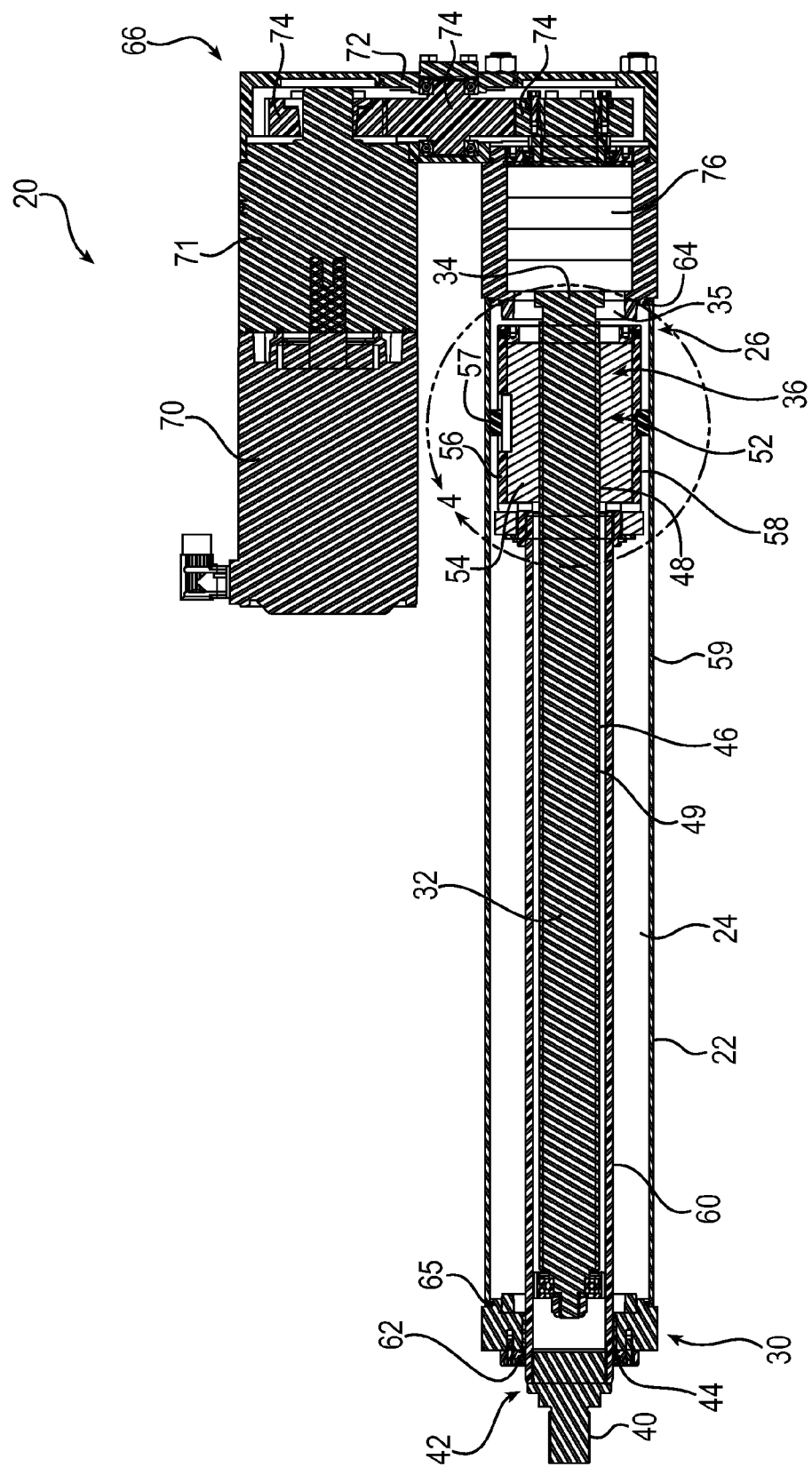
FIG. 3 is a partial cross-sectional view of the cylinder assembly of FIG. 1.
Figure 4:
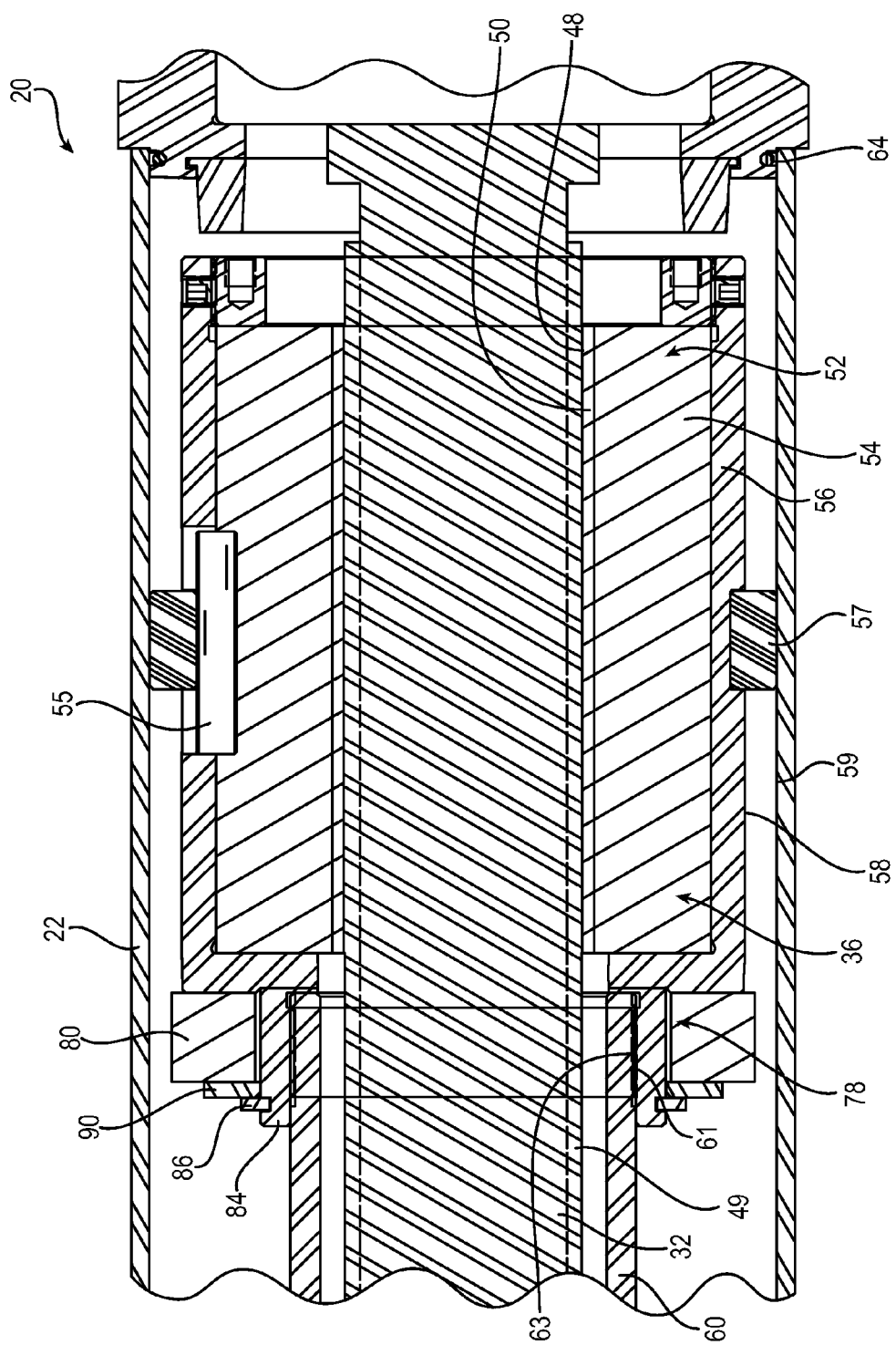
FIG. 4 is enlargement of a portion of the view of FIG. 3.
Figure 5:
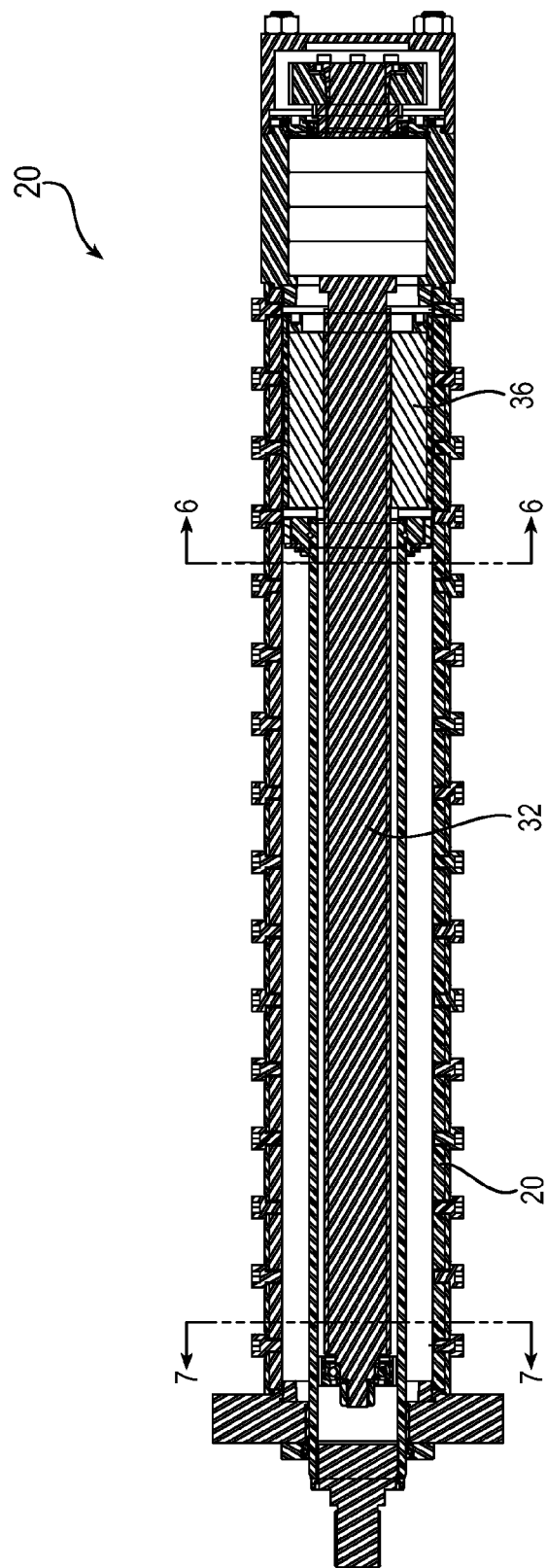
FIG. 5 is another partial cross-sectional view of the cylinder assembly of FIG. 1.
Figure 6:
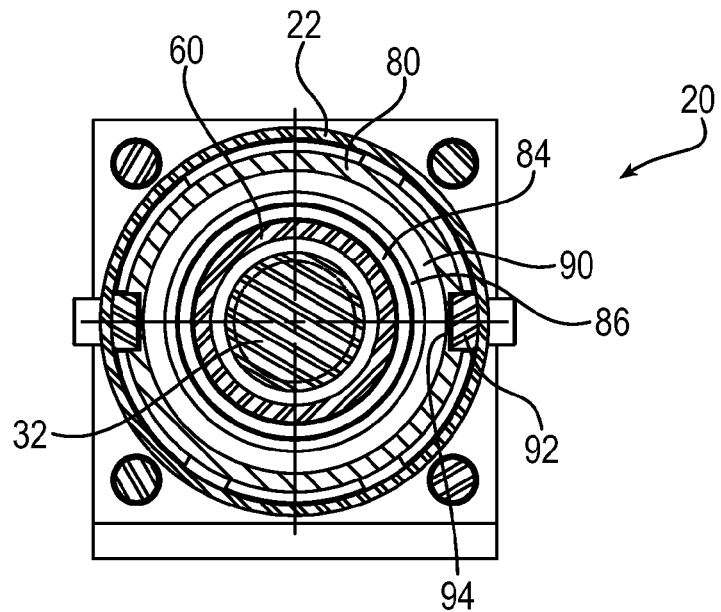
FIG. 6 is still another cross-sectional view of the cylinder assembly of FIG. 1.
Figure 7:
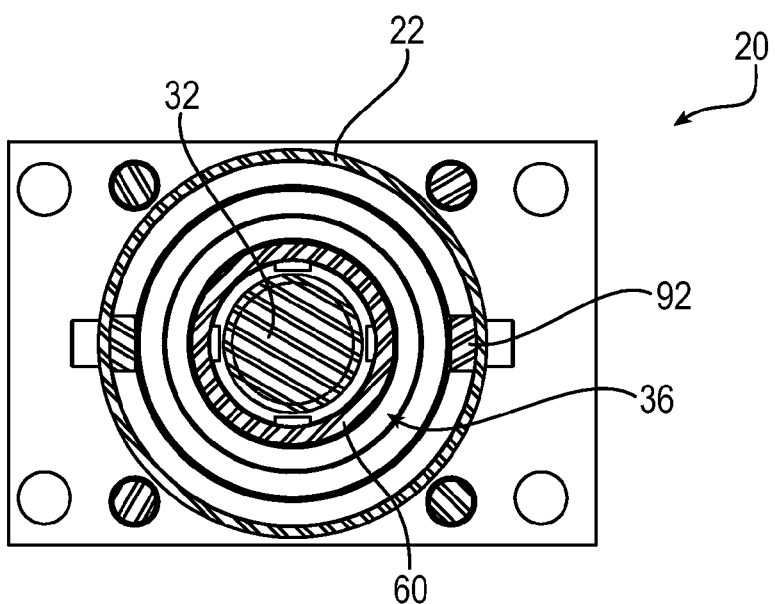
FIG. 7 is a further cross-sectional view of the cylinder assembly of FIG. 1.

Generally, the present invention enables the prevention of a first tube, or thrust tube, of a cylinder assembly from rotating inside of another tube, or cylinder, as the first tube extends or retracts relative to the second tube. Particularly, the present invention enables the resisting of catalogued torques for a screw mechanism, which converts rotary input into linear motion. Turning screw mechanisms induce torque or an applied load to adjoining members, such as a cylinder of the assembly. This torque or load is resisted by an internal member of the assembly, such as by a nut of a nut and screw assembly, as in accordance with the present invention, or by an external feature disposed downstream of the assembly, as in conventional cylinder assemblies.

Accordingly, the present invention provides and extendable cylinder assembly that includes an internal anti-rotate feature. The anti-rotate feature generally prevents an internal part, such as a nut of a nut and screw assembly from rotating. The feature may be used in particular with cylinder assemblies made of steel but may also be applicable to aluminum cylinder assemblies or cylinder assemblies made of any other suitable material.

It should be noted that extruded steel profiles (having features other than a cylindrical wall) are generally expensive and difficult to produce due to the inherent nature of the material and required tolerancing of portions of the anti-rotate feature, such as the keys or slots. Thus, the present invention provides an anti-rotate feature that may be used with steel tubing, steel cylinders, or tubing and cylinders of other suitable materials, which are generally difficult to extrude and produce due to cost and tight tolerancing concerns, let alone to extrude with additional features other than merely the generally cylindrical tube.

Anti-rotate features of the present invention may avoid external torque of the nut and screw assembly, and also of a drive assembly for driving the nut and screw assembly, thereby allowing the user to mount the assembly to external framing without concern for externally resisting the torque. The internal anti-rotate feature provides value by saving customer design time, assembly time, and material costs associated with requiring an external anti-rotate feature necessary to resist the torque. The present invention provides this anti-rotate feature internally thereby allowing the user more freedom and flexibility in designing an extendable cylinder assembly. The internal anti-rotate feature may be achievable on small or large frame sizes with increased loading capacity as the sizes increase.

Referring now to the drawings in detail, and initially to FIGS. 1-7, an exemplary extendable cylinder assembly for use in force transfer applications is illustrated at reference numeral 20.

As shown, the extendable cylinder assembly 20 includes a cylinder 22, in particular a steel cylinder, having an internal cylinder cavity 24. The internal cylinder cavity 24 extends between a first end 26 and a second end 30 disposed opposite the first end 26. A nut and screw assembly is housed within the cylinder 22. The screw of the nut and screw assembly, such as a roller screw 32, is rotatable within the cylinder 22 and is rotatably fixed at a proximal end 34 of the screw 32 by a shoulder 35 of the cylinder 22 adjacent the first end 26 of the cylinder 22.

The nut 36 of the nut and screw assembly is engaged and driven by the screw 32. The nut 36 is disposed within and moveable within the internal cylinder cavity 24 between the first and second ends 26 and 30 of the cylinder 22. An outer surface 46 of the screw 32 and an inner surface 48 of the nut 36 may include engagement means, such as corresponding threads 49 and 50, respectively. The threads 50 of the nut 36 allow for the nut 36 to be axially translated or driven relative to the screw 32, between the first and second ends 26 and 30 of the cylinder 22.

The cylinder assembly 20 includes an attachment means 40, such as a protrusion, coupling, etc., at a distal end 42 configured for engaging or attaching to an external component (not shown), thereby allowing for transfer of force, such as axial force, from the cylinder assembly 20 to the external component. The attachment means 40 may extend from an opening 44 in the second end 30 of the cylinder 22. Note that during use of the cylinder assembly 20, structure of the assembly, such as external structure of the cylinder 22, may be mounted to external framing or an external mounting surface (not shown) to stabilize the cylinder 22 relative to the attachment means 40.

The nut 36 includes an engagement portion 52 having the threads 50 for engaging with the threads of the screw 32. As shown, the engagement portion 52 includes an inner portion 54 disposed radially inward of an outer nut carrier portion 56. As shown, the nut carrier portion 56 is at least partially coupled to the inner portion 54 via a key 55, which may be press fit, glued, or threaded, for example, and is disposed between the nut carrier portion 56 and the inner portion 54. Alternatively, the nut carrier portion 56 may be coupled to the inner portion 54 via adhesives, welding, or any other suitable methods, or the nut carrier portion 56 may be integral with the inner portion 54. A pair of opposed wear strips 57 are attached to an outer surface 58 of the nut carrier portion 56 for engaging an inner surface 59 of the cylinder 22. Any suitable number of wear strips 57 may be used and the wear strips 57 may be made of any suitable material for allowing efficient movement of the nut 36 relative to the cylinder 22. The wear strips 57 may be replaceable, allowing the cylinder assembly 20 to be utilized for a longer period of time without replacing the entire assembly 20.

The cylinder assembly 20 also includes a tube portion, such as a thrust tube 60. The thrust tube 60 is coupled to the nut 36, such as to a distal end of the nut carrier portion 56 of the engagement portion 52.

The thrust tube 60 may be coupled via tube threads 63 for engaging corresponding nut threads 61, although alternative coupling methods may be suitable. The tube 60 includes the attachment means 40 for engaging and/or attaching to the external component. The tube 60 extends axially from the engagement portion 52 and may extend from the second end 30 of the cylinder 22.

Further, the tube 60 is disposed about the screw 32, such as being coaxial with the screw 32.

Note that the cylinder 22 may include at least one sealing member, such as o-rings 62, disposed at the second end 30 of the cylinder 22 between the cylinder 22 and the tube 60 to seal the inner cavity 24 of the cylinder 22 from an external environment. Additional sealing members, such as o-rings 64, may be disposed at the first end 26 of the cylinder 22 between the cylinder 22 and a prime mover, such as a drive assembly 66. Sealing members, such as o-rings 65 may be disposed at the second end 30 of the cylinder 22, between cylinder components.

The drive assembly 66 may be mounted at the first end 26 of the cylinder 22 opposite the second end 30. The drive assembly 66 may be an electrical, mechanical, pneumatic, or hydraulic assembly or any combination thereof, for effecting axial translation of the nut 36 relative to the screw 32, thereby causing the thrust tube 60 to axially extend or retract relative to the cylinder 22.

The drive assembly 66 may be an electric motor, and thus the cylinder assembly 20 may be activated electronically via a controller, such as via a programmable logic controller (PLC) (not shown). The drive assembly 66 includes a motor 70, a gear box 71, and a gear set 72. The motor 70 engages the gear box 71, which drives at least one gear 74 of the gear set 72. The gear 74 in turn engages and drives the screw 32. Note that as shown in FIG. 1, a bearing set 76 may be disposed between three gears 74 and the screw 32, and any suitable number of gears may be used. Additionally, any suitable prime mover may be utilized for rotating the screw, and may include any suitable components.

Turning now to FIGS. 4 through 10, the cylinder assembly 20 further includes an internal anti-rotate feature 78 for resisting rotation of the nut 36 relative to the cylinder 22 as the nut 36 axially translates relative to the screw 32. The anti-rotate feature 78 is at least partially housed within the cylinder 22 and generally includes an arrangement of interengaging splines or keys and slots. At least one spline or key is coupled, such as removably coupled, to one of the nut 36 or the cylinder 22, and at least one slot of a corresponding rail or slotted member is coupled, such as removably coupled, to the other of the nut 36 or the cylinder 22.

The anti-rotate feature 78 further includes a guide member 80 which includes at least one of the keys or slots of the arrangement of keys and slots. The guide member 80, in conjunction with the arrangement of keys and slots, serves as the internal anti-rotate feature 78 of the cylinder assembly 20. The guide member 80 is coupled between the cylinder 22 and the nut 36. The guide member 80 and the nut 36 are coupled via a first key and slot arrangement, and the guide member 80 and the cylinder 22 are coupled via another key and slot arrangement.

Figure 8:
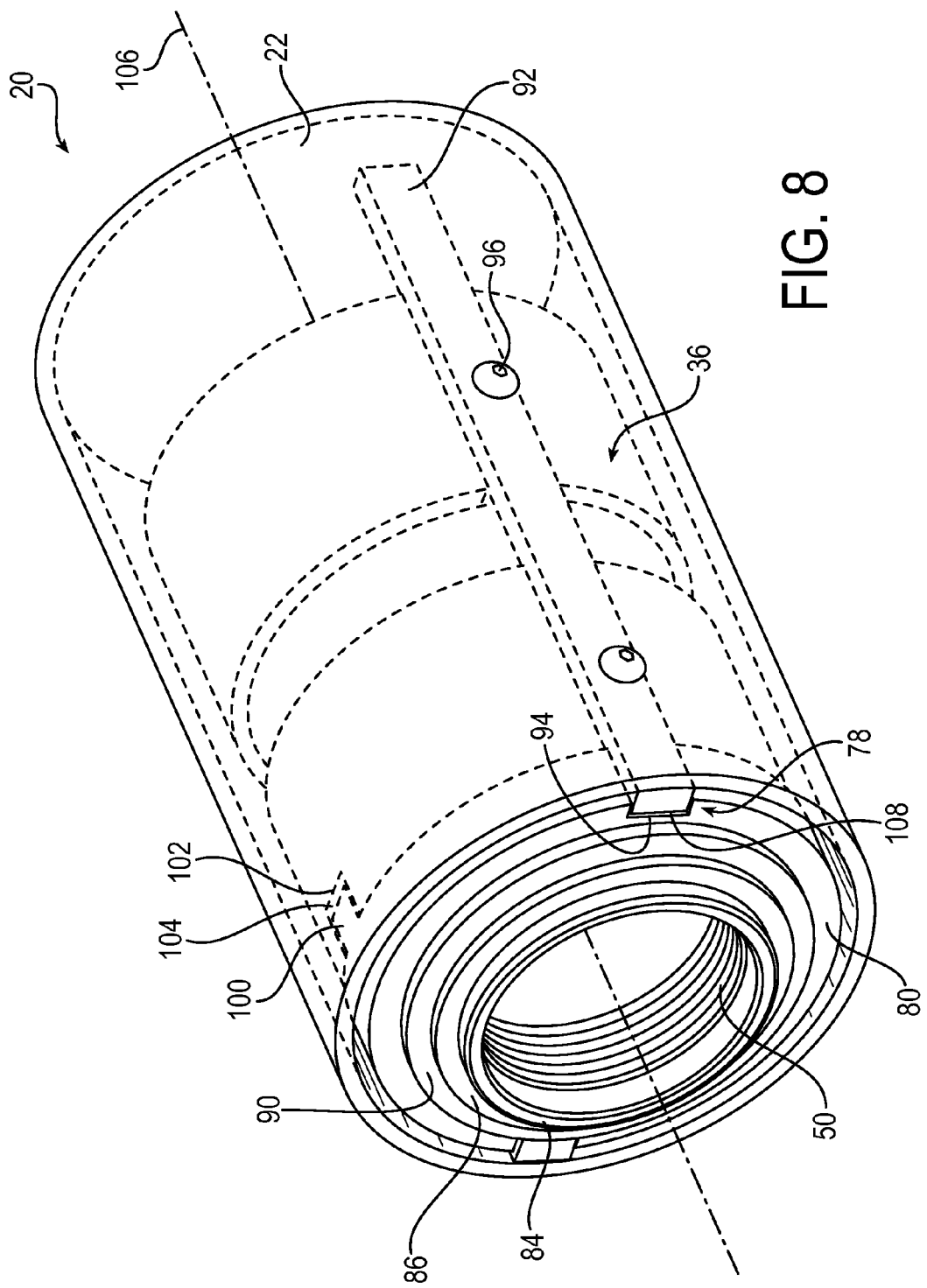
FIG. 8 is a partial perspective view of the cylinder assembly of FIG. 1.
Figure 9:
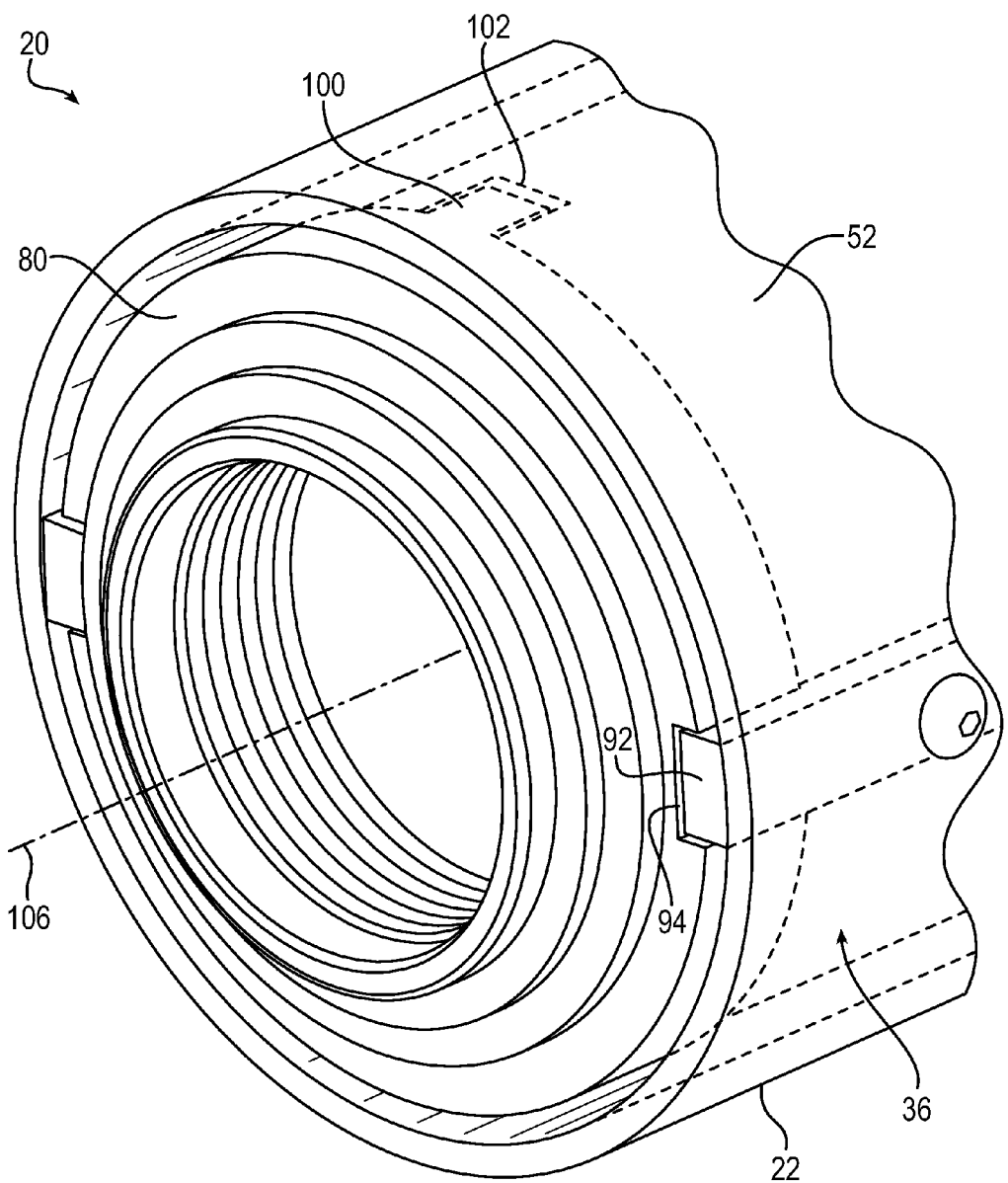
FIG. 9 is a partial perspective view of the cylinder assembly of FIG. 8.
Figure 10:
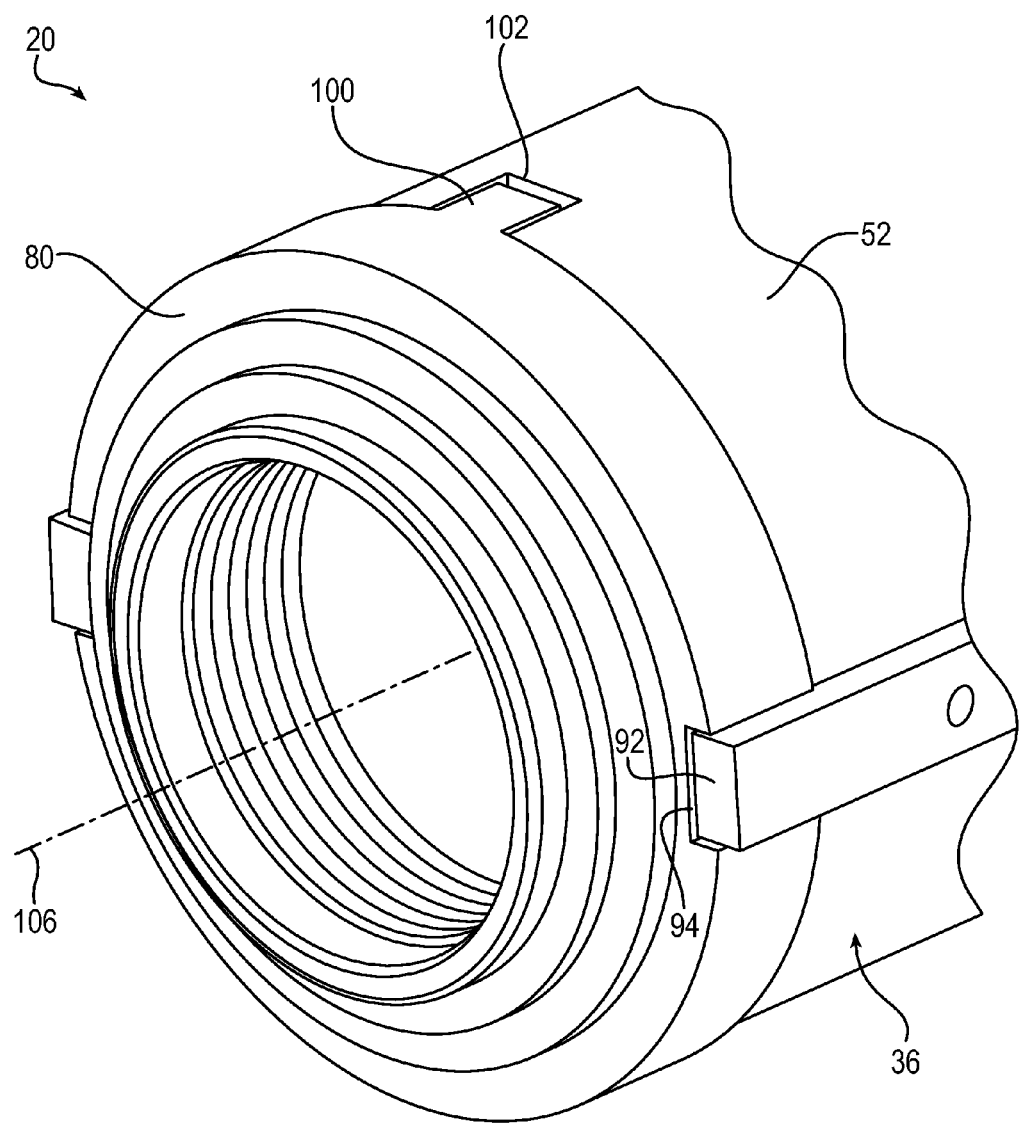
FIG. 10 is another partial perspective view of the cylinder assembly of FIG. 8.

As shown in the embodiment of FIGS. 8-10, the guide member 80 is an annular ring disposed about a distal lip section 84 of the nut carrier portion 56. The distal lip section 84, which is disposed about the screw 32, includes the tube threads 61 and is coupled to the thrust tube 60. A retainer, such as an annular retaining ring 86, is received in a slot of the distal lip section 84, and a spacer, such as an annular spacer 90, is disposed between the retaining ring 86 and the guide member 80. Upon movement of the nut 36 towards the first end 26, the guide member 80 is carried by the nut 36. Particularly, the guide member 80 is retained in common translational movement with the nut 36 via the retaining ring 86 and spacer 90. It will be appreciated that one or both of the spacer 90 and the retaining ring 86 may not be included, or that one or both of the spacer 90 and the retaining ring 86 may be integral with the nut 36.

The guide member 80 may be a slotted member and may include a pair of opposed slots 94. A pair of corresponding opposed keys 92 is coupled to the cylinder 22, and is received by the slots 94. The keys 92 are coupled, such as removably coupled, to the inner surface 59 or inner diameter of the cylinder 22 via fasteners 96, such as socket head cap screws, button head cap screws, or rivets, for example. The keys 92 extend between the first and second ends 26 and 30 of the cylinder 22. Any suitable number of corresponding keys 92 and slots 94 may be included. The corresponding engaged keys 92 and slots 94 generally prevent or restrict rotation of the guide member 80 relative to the cylinder 22, and thus also generally prevent or restrict rotation of the nut 36 relative to the cylinder 22.

At least one of the key 92 or slot 94 may be made of a wear-resistant material. Such feature, which may be replaceable, may allow the cylinder assembly 20 to be utilized for a longer period of time without replacing the entire assembly 20.

Figure 11:
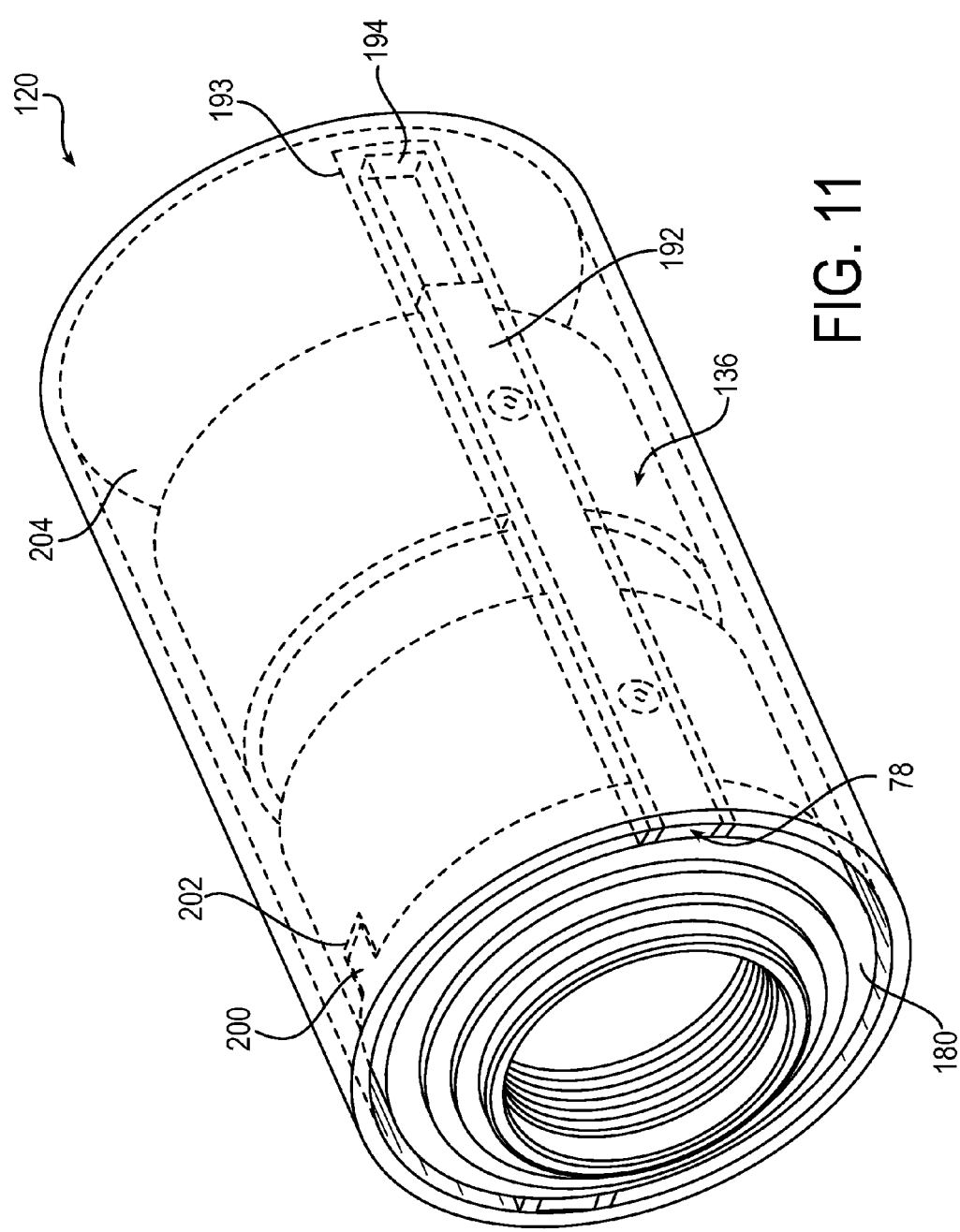
FIG. 11 is a partial perspective view of another exemplary cylinder assembly.
Figure 12:
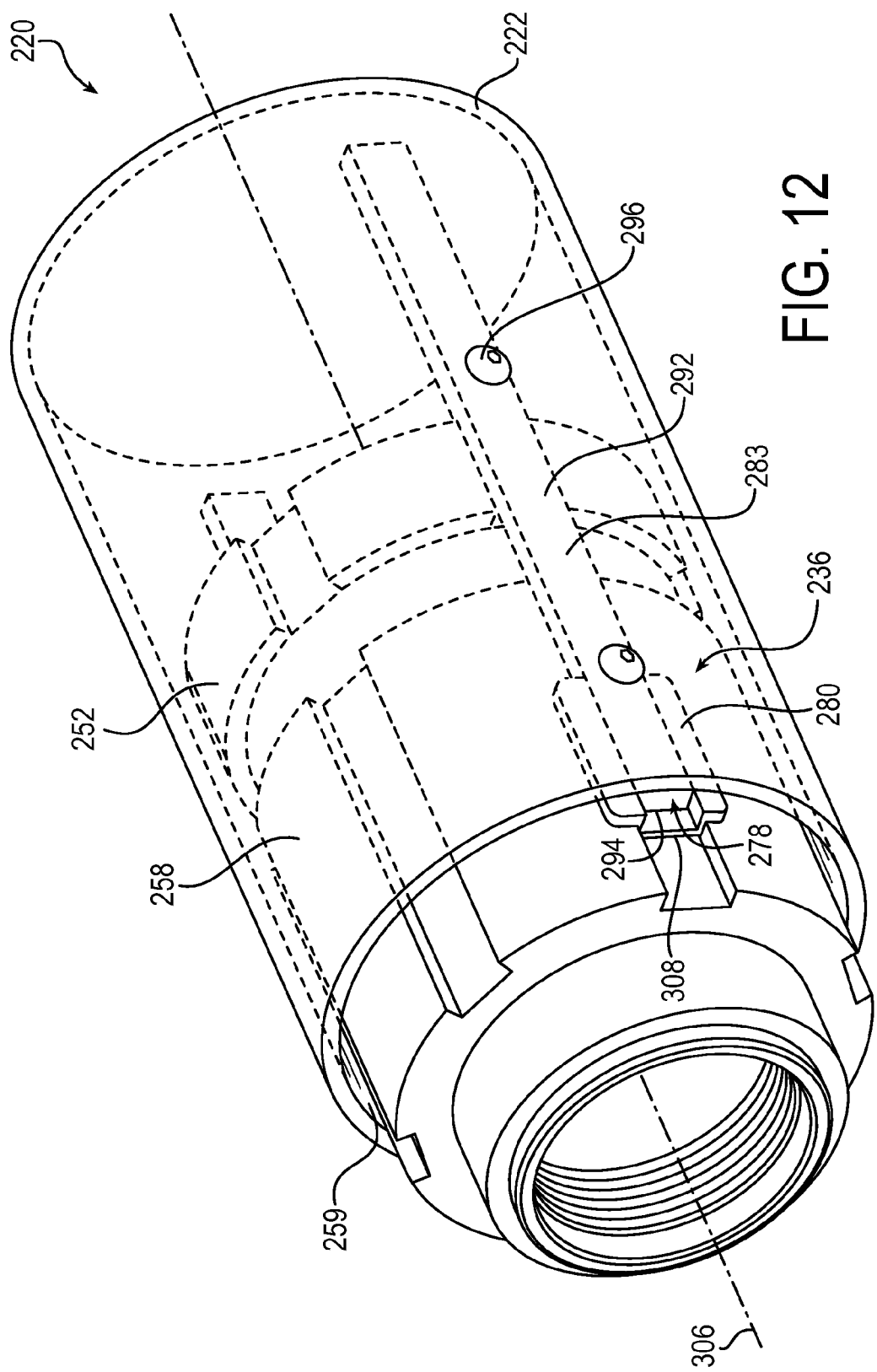
FIG. 12 is a partial perspective view of yet another exemplary cylinder assembly.
Figure 13:
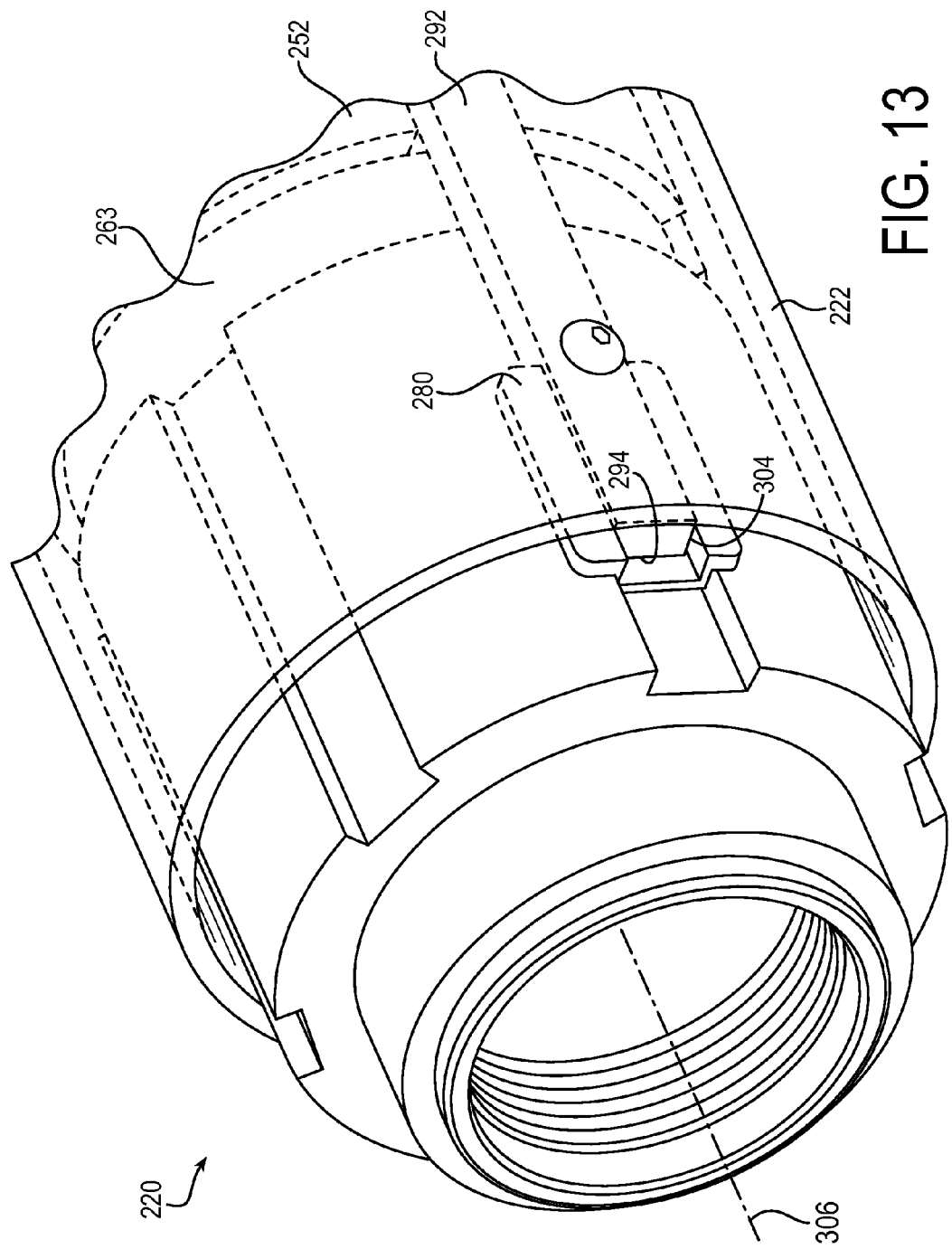
FIG. 13 is a partial perspective view of the cylinder assembly of FIG. 12.
Figure 14:
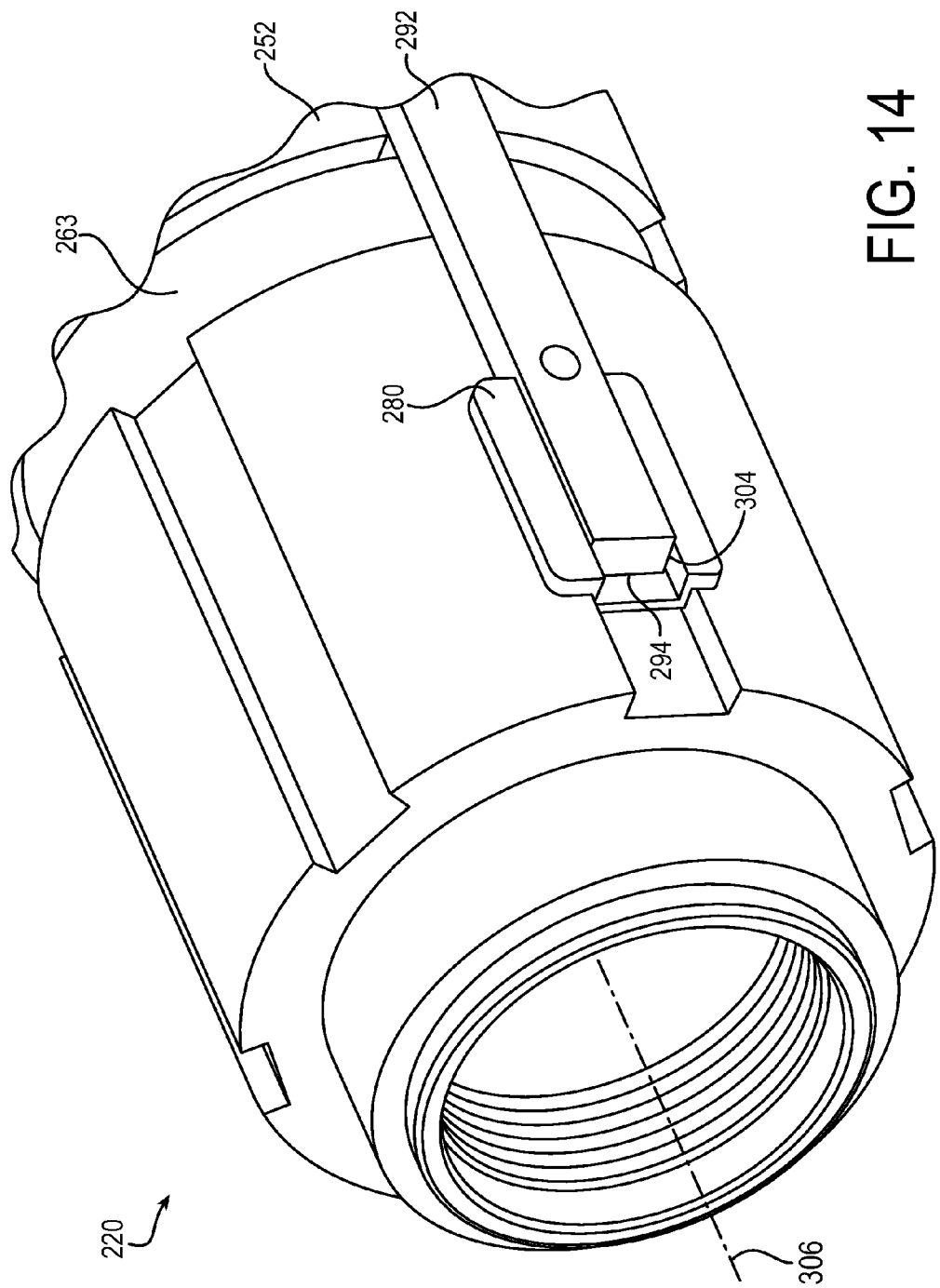
FIG. 14 is another partial perspective view of the cylinder assembly of FIG. 12.
Figure 15:
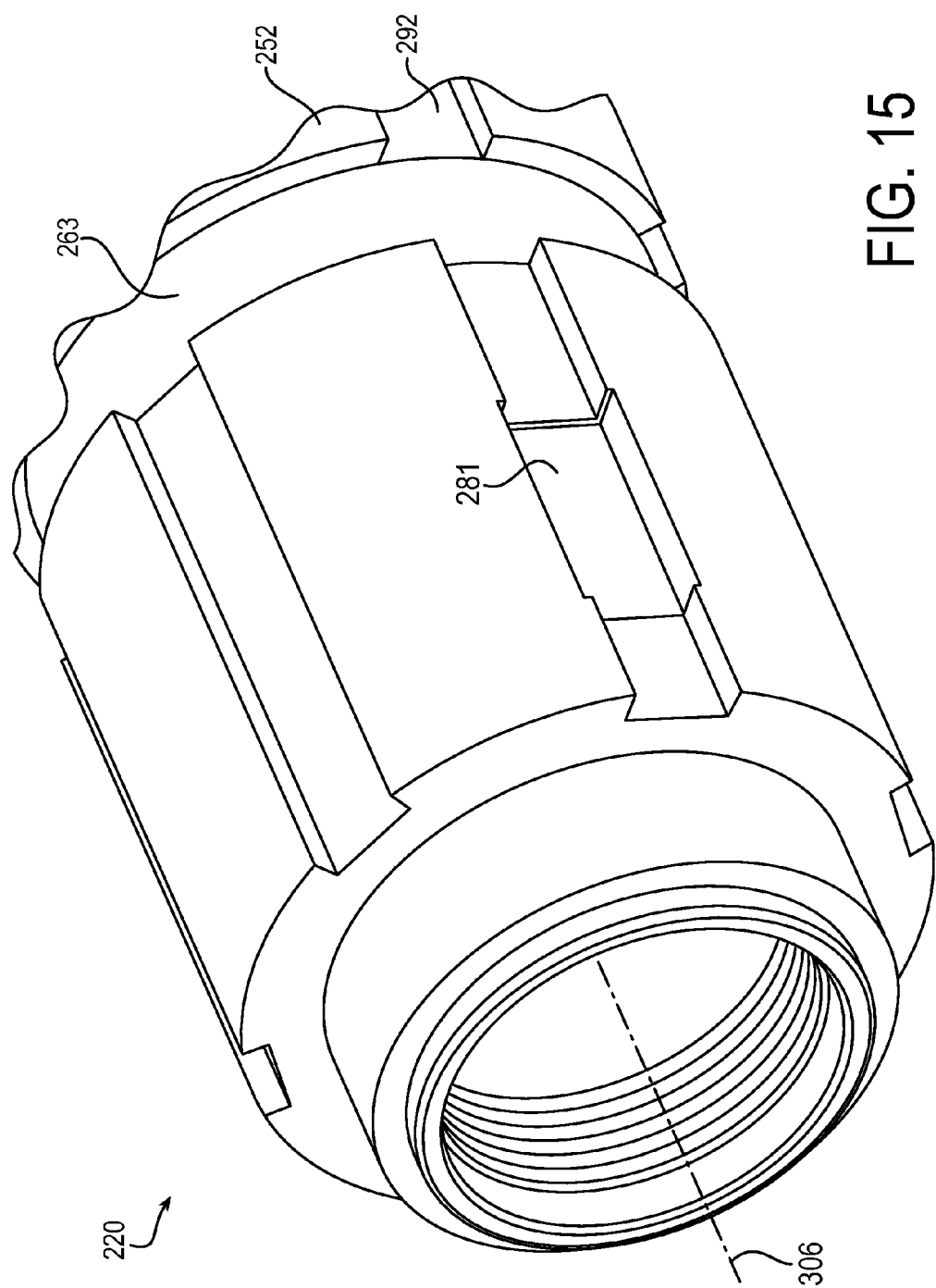
FIG. 15 is still another partial perspective view of the cylinder assembly of FIG. 12, showing portions of the cylinder assembly removed for clarity.

It will be appreciated that instead the guide member 80 may include the key 92 and that the cylinder 22 may include the slots 94, to be discussed further with reference to FIG. 11.

The guide member 80 may also include a pair of opposed protrusions, such as tabs 100, which are received by the nut carrier portion 56 of the nut 36. As shown, the nut carrier portion 56 includes a pair of corresponding opposed depressions, such as grooves 102, which receive the tabs 100. The corresponding tabs 100 and grooves 102 are positioned about the guide member 80 such that they are spaced apart, such as circumferentially spaced apart, from the corresponding keys 92 and slots 94. The corresponding tabs 100 and grooves 102 generally prevent rotation of the nut 36 relative to the cylinder 22, to be discussed further. It will be appreciated that any number of opposed tabs 100 and grooves 102 may be included, and that the guide member 80 may instead include the grooves 102 and the nut 36 may include the tabs 100. Additionally, at least one of the tabs 100 or the grooves 102 may be made of a wear-resistant material and may be replaceable, allowing the assembly 20 to be utilized for a longer period of time without replacing the entire assembly 20.

As noted, the guide member 80 serves to generally prevent rotation of the nut 36 relative to the cylinder 22. The guide member 80 also serves to prevent binding of the nut 36 relative to the cylinder 22 during axial translation of the nut 36 relative to the screw 32. The coupling of the guide member 80 between the nut 36 and the cylinder 22 is a loose coupling accommodating for misalignment of the nut 36 relative to the cylinder 22. Accordingly, the loose coupling enables limited movement of the guide member 80 relative to each of the nut 36 and the cylinder 22, such that the guide member 80 may float, adjust, or shift relative to each of the nut 36 and the cylinder 22.

For example, the guide member 80 is loosely constrained by each of the nut 36 and the cylinder 22 for canting movement relative to at least one of the nut 36 or the cylinder 22. The fit between an inner diameter of the guide member 80 and an outer diameter of the distal lip section 84 may not be tightly toleranced. In such case, the guide member 80 is allowed canting movement about an axis orthogonal to a central longitudinal axis 106 of the cylinder 22 along which the nut 36 translates.

To further enable the canting movement, the fit between the corresponding keys 92 and slots 94, and between the corresponding tabs 100 and grooves 102, may not be tightly toleranced (is slightly loose to allow some limited relative canting movement via slippage). In such case, the slots 94 are sized slightly larger than the corresponding keys 92 with spaces 104 disposed therebetween, and the grooves 102 are sized slightly larger than the corresponding tabs 100 with spaces 108 disposed therebetween.

In summarizing use of the cylinder assembly 20, activation of the drive assembly 66 causes rotation of the screw 32. Depending on the direction of rotation of the screw 32, the nut 36 will be caused to axially translate relative to the cylinder 22 between the first and second ends 26 and 30. The thrust tube 60 of the nut 36 will be caused to extend or retract from the opening 44 in the second end 30 of the cylinder 22. As a result, movement of the nut 36 towards the second end 30 of the cylinder 22 causes extension of the thrust tube 60 with respect to the second end 30, while movement of the nut 36 towards the first end 26 of the cylinder 22 causes retraction of the thrust tube 60 with respect to the second end 30 of the cylinder 22. During axial translation of the nut 36, rotation of the nut 36 is generally resisted by the anti-rotation feature 78. The floating nature of the guide member 80 of the anti-rotation feature 78 will generally prevent binding of the nut 36 relative to the cylinder 22 and also generally accommodate for misalignment of the nut 36 relative to the cylinder 22.

Turning now to FIG. 11, an alternative cylinder assembly is shown at 120. The cylinder assembly 120 may be used in place of the assembly 20 (FIG. 3), and the discussion below omits many features of the assembly 120 that are similar to those of the assembly 20. In addition, features of the assembly 120 may be combined with those of the assembly 20.

Different from the cylinder assembly 20 depicted in FIG. 8, the nut 136 of the cylinder assembly 120 of FIG. 11 includes opposed tabs 200, and the guide member 180 includes corresponding opposed grooves 202. Additionally, the guide member 180 includes opposed keys 192, while corresponding opposed slotted members 193, which include slots 194, are coupled, such as removably coupled, to the cylinder 222.

Turning next to FIGS. 12-15, another alternative cylinder assembly is shown at 220. The cylinder assembly 220 may be used in place of the assembly 20 (FIG. 3) or the assembly 120 (FIG. 11), and the discussion below omits many features of the assembly 220 that are similar to those of the assembly 20 and the assembly 120. In addition, features of the assembly 220 may be combined with those of the assembly 20 and/or the assembly 120.

As shown in FIGS. 12-15, opposed guide members 280 are coupled, such as movably coupled, to an outer surface of a nut 236, such as the outer surface 258 of the engagement portion 252. The guide members 280 are carried by the nut 236 for common translation with the nut 236. The engagement portion 252 includes opposed surface cavities 281 for respectively receiving the opposed guide members 280. The opposed guide members 280 are loosely constrained between the engagement portion 252 of the nut 236 and rails 283 coupled to the cylinder 222. As shown, the guide members 280 are slotted members and include opposed slots 294 for receiving opposed keys 292. The rails 283 include the opposed keys 292 and are coupled, such as removably coupled, to an inner surface 259 or inner diameter of the cylinder 222. The keys 292 are coupled via fasteners 296, such as socket head cap screws, button head cap screws, or rivets, for example, and may extend between first and second ends of the respective cylinder 222. It will be appreciated that the guide members 280 may instead include the opposed keys 292 and that the rails 283 coupled to the cylinder 222 may include the opposed slots 294.

The guide members 280 prevent binding of the nut 236 relative to the cylinder 222 during axial translation of the nut 236 relative to a respective screw. The engagement of the guide members 280 in the respective cavities 281 and engagement of the keys 292 in the corresponding slots 294 enables limited movement of the guide members 280 relative to each of the nut 236 and the cylinder 222, such that the guide members 280 may float, adjust, or shift relative to each of the nut 236 and the cylinder 222.

For example, the guide members 280 are loosely constrained by each of the nut 236 and the cylinder 222 for canting movement relative to at least one of the nut 236 and the cylinder 222. The fit between the guide members 280 and the cavities 281 may not be tightly toleranced (is slightly loose to allow some limited relative canting movement via slippage). In such case, the guide members 280 are allowed canting movement about respective axes parallel to a central longitudinal axis 306 of the cylinder 222 along which the nut 236 translates. To further enable the canting movement, the fit between the corresponding keys 292 and slots 294 may not be tightly toleranced. In such case, the slots 294 are sized slightly larger than the corresponding keys 292 with spaces 308 disposed therebetween.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:
1. A cylinder assembly including:
   a cylinder;
   a nut and screw assembly housed within the cylinder;
   a thrust tube that extends axially from the nut and out a first end of the cylinder;
   a drive assembly mounted at a second end of the cylinder opposite the first end for rotating the screw to effect translation of the nut along the screw, thereby causing the thrust tube to axially extend or retract relative to the cylinder; and an anti-rotate feature for restricting rotation of the nut relative to the cylinder, wherein the anti-rotate feature includes a guide member coupled between the nut or the thrust tube and the cylinder, wherein one of the guide member or the cylinder includes a key, and wherein the other of the guide member or the cylinder includes a corresponding slot that receives the key, wherein the guide member is allowed limited canting movement relative to the nut or to the thrust tube to prevent binding of the nut and the cylinder relative to one another.

2. The cylinder assembly of claim 1, wherein the guide member is an annular member disposed about the screw.

3. The cylinder assembly of claim 1, wherein the guide member is loosely constrained by the nut or by the thrust tube for allowing the canting movement.

4. The cylinder assembly of claim 3, wherein the canting movement includes movement of the guide member about an axis orthogonal to a central longitudinal axis of the cylinder along which the nut translates.

5. The cylinder assembly of claim 3, wherein the canting movement includes rotational movement of the guide member about an axis parallel to a central longitudinal axis of the cylinder along which the nut translates.

6. The cylinder assembly of claim 3, wherein the guide member and the nut are coupled via a slot and key arrangement.

7. The cylinder assembly of claim 1, wherein the anti-rotate feature includes a pair of opposed slotted guide members coupled to the nut or to the thrust tube and the cylinder includes a pair of opposed keys that are received by the opposed slotted guide members.

8. The cylinder assembly of claim 7, wherein the opposed slotted members are loosely coupled to the nut for canting movement to accommodate for misalignment of the nut relative to the cylinder.

9. The cylinder assembly of claim 1, wherein the guide member translates with the nut.

10. A cylinder assembly including:
a cylinder extending between first and second ends;
a screw housed by the cylinder;
a nut disposed about and engaged with the screw;
a thrust tube extending axially from the nut and disposed about the screw, the thrust tube at least partially extending from the first end of the cylinder;
a guide member coupled to one of the nut or the thrust tube;
a rail attached to the inner diameter of the cylinder, wherein the rail is separately-formed from the cylinder; and
a key provided on one of the guide member or the rail and a slot provided on the other of the guide member or the rail;
wherein the slot receives the key for restricting rotation of the nut relative to the cylinder,
and wherein the guide member is allowed limited canting movement relative to the cylinder for preventing binding of the guide member with the rail.

11. The cylinder assembly of claim 10, wherein the cylinder is made of steel.

12. The cylinder assembly of claim 10, wherein the key is provided on the rail and the slot is provided on the guide member.

13. The cylinder assembly of claim 10, wherein the limited canting movement of the guide member relative to the nut includes canting movement about an axis orthogonal to a central longitudinal axis of the cylinder along which the nut translates.

14. The cylinder assembly of claim 10, wherein the limited canting movement of the guide member relative to the nut includes canting movement of the guide member about an axis parallel to a central longitudinal axis of the cylinder along which the nut translates.

15. The cylinder assembly of claim 1, wherein the cylinder is made of steel.

16. The cylinder assembly of claim 1, wherein the limited canting movement is allowed about at least two axes orthogonal to one another.

17. The cylinder assembly of claim 1, wherein the limited canting movement is allowed about three axes orthogonal to one another.

18. The cylinder assembly of claim 1, wherein the anti-rotate feature includes a cylinder-attached portion that is separately-formed from and attached to the cylinder at an inner diameter of the cylinder, and which includes the key or the corresponding slot of the cylinder.

19. The cylinder assembly of claim 1, wherein the anti-rotate feature is fully housed within the cylinder.

20. The cylinder assembly of claim 10, wherein the limited canting movement is allowed about at least two axes orthogonal to one another.

* * * * *